US010202240B2

(12) United States Patent
De Angelis et al.

(10) Patent No.: US 10,202,240 B2
(45) Date of Patent: Feb. 12, 2019

(54) STORAGE SYSTEM

(71) Applicant: Iron Mountain Incorporated, Boston, MA (US)

(72) Inventors: Marco De Angelis, Montespertoli (IT); Jeremy Suratt, Wayland, MA (US)

(73) Assignee: IRON MOUNTAIN INCORPORATED, Boston, MA (US)

( * ) Notice: Subject to any disclaimer, the term of this patent is extended or adjusted under 35 U.S.C. 154(b) by 95 days.

(21) Appl. No.: 15/189,744

(22) Filed: Jun. 22, 2016

(65) Prior Publication Data
US 2016/0376103 A1 Dec. 29, 2016

Related U.S. Application Data

(60) Provisional application No. 62/183,549, filed on Jun. 23, 2015.

(51) Int. Cl.
B65G 1/137 (2006.01)
A47B 63/00 (2006.01)
(Continued)

(52) U.S. Cl.
CPC ............ B65G 1/1371 (2013.01); A47B 63/00 (2013.01); B65G 1/0492 (2013.01); B65G 1/065 (2013.01); B65G 2201/0288 (2013.01)

(58) Field of Classification Search
CPC .... B65G 1/1371; B65G 1/0492; B65G 1/065; B65G 1/06; B65G 1/1373; B65G 1/0414;
(Continued)

(56) References Cited

U.S. PATENT DOCUMENTS 3,800,963 A * 4/1974 Holland ............... B65G 1/0414
191/12.2 R
4,459,078 A * 7/1984 Chiantella ............ B65G 1/0414
414/279
4,636,634 A * 1/1987 Harper ................. B65G 1/1371
235/385

(Continued)

FOREIGN PATENT DOCUMENTS

WO 2016209976 12/2016

OTHER PUBLICATIONS

PCT/US2016/038785, "International Preliminary Report on Patentability", dated Jan. 4, 2018, 7 pages.
(Continued)

Primary Examiner — Glenn F Myers
(74) Attorney, Agent, or Firm — Kilpatrick Townsend & Stockton LLP

(57) ABSTRACT

In one arrangement, a storage system for storing items includes an enclosure enclosing a hypoxic environment, and a pallet shuttle system comprising rows of racks disposed within the hypoxic environment. The pallet shuttle system also includes at least one transfer car and at least one shuttle for carrying storage modules into and out of the racks. The system further includes a loading station outside the hypoxic environment, and an enclosure door to the hypoxic environment. The enclosure door is operable to admit the transfer car of the pallet shuttle system into and out of the hypoxic environment, and to close the hypoxic environment upon passage of the transfer car through the door. Optionally, the system includes paneling separating the enclosure into at least two separately climate-controlled zones such that at least one of the racks is in each of the at least two separately climate-controlled zones.

11 Claims, 10 Drawing Sheets

(51) Int. Cl.
*B65G 1/04* (2006.01)
*B65G 1/06* (2006.01)

(58) Field of Classification Search
CPC ... A47F 3/0486; A62C 3/002; A62C 99/0018; B01D 2257/104
See application file for complete search history.

(56) References Cited

U.S. PATENT DOCUMENTS

| | | | |
|---|---|---|---|
| 5,002,449 A * | 3/1991 | Kita | B65G 1/0492 414/273 |
| 5,167,575 A * | 12/1992 | MacDonald | E04B 2/827 454/187 |
| 5,174,454 A * | 12/1992 | Parkander | B65G 1/0407 209/3.3 |
| 5,887,439 A * | 3/1999 | Kotliar | A23L 3/3418 426/418 |
| 6,401,487 B1 | 6/2002 | Kotliar | |
| 6,652,213 B1 | 11/2003 | Mitchell et al. | |
| 6,799,521 B2 * | 10/2004 | Tai | B65G 1/0414 104/88.01 |
| 8,251,629 B2 * | 8/2012 | Schifman | G07F 11/44 221/1 |
| 9,008,827 B1 | 4/2015 | Dwarakanath et al. | |
| 2007/0065259 A1 | 3/2007 | Talley | |
| 2013/0129453 A1 | 5/2013 | Salichs et al. | |
| 2014/0277689 A1 | 9/2014 | Salichs | |

OTHER PUBLICATIONS

International Application No. PCT/US2016/038785, International Search Report and Written Opinion dated Sep. 8, 2016, 9 pages.

* cited by examiner

STORAGE SYSTEM

CROSS-REFERENCE TO RELATED APPLICATIONS

This application claims the benefit of U.S. Provisional Patent Application No. 62/183,549 filed Jun. 23, 2015 and titled "Storage System", the entire contents of which are hereby incorporated by reference herein.

BACKGROUND

Books historically have been stored on shelves in libraries. However, over the past few decades libraries have become more than just a place to check out a book. Rather, they have become places where people come to work, study, etc. Consequently, the need has arisen for more work spaces in libraries. As a result, libraries have begun storing some books in offsite storage facilities to reclaim space within the library for other purposes.

Existing offsite storage facilities typically consist of a warehouse filled with book shelves or racks. Harvard University was the first to introduce high density storage facilities in the mid-1980s, where books are sorted by size (as opposed to LC call numbers or Dewey Decimal) and stored in cardboard boxes or trays provided on the racks. See FIGS. 1-3. Adjacent racks are separated by an aisle. Computer software is used to inventory the books and assign a location within the warehouse for a book. The warehouse is climate controlled, whereby the temperature and humidity levels are strictly managed. For example, a book depository will typically maintain between 55° F.+/−5° F. and 35%+/−5% relative humidity. When a book is ordered, a worker ascertains the location of the book from the computer and operates a forklift in the aisle between adjacent racks to manually retrieve the book. See FIGS. 2A-2C.

BRIEF SUMMARY

Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to one aspect, a storage system for storing items comprises an enclosure enclosing a hypoxic environment, and a pallet shuttle system comprising rows of racks disposed within the hypoxic environment. The pallet shuttle system includes at least one transfer car and at least one shuttle for carrying storage modules into and out of the racks. The system further comprises a loading station disposed outside the hypoxic environment, and an enclosure door to the hypoxic environment. The enclosure door is operable to admit the transfer car of the pallet shuttle system into and out of the hypoxic environment, and is operable to close the hypoxic environment upon passage of the transfer car through the door.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below.

Prior storage systems as described above have been expensive to build and operate, may not scale well, and may not accommodate a variety of item types for storage, for example a variety of items that require different environmental storage conditions. Embodiments of the present storage system improve upon existing offsite storage systems by creating a contained environment that may be totally automated, climate controlled, and hypoxic and by increasing the storage density within a warehouse footprint. While the storage system is described primarily for storage of books, it can be used to store anything, including books, film, artifacts, boxes of material, art work, wine, clothing, or other items.

Figure 1:
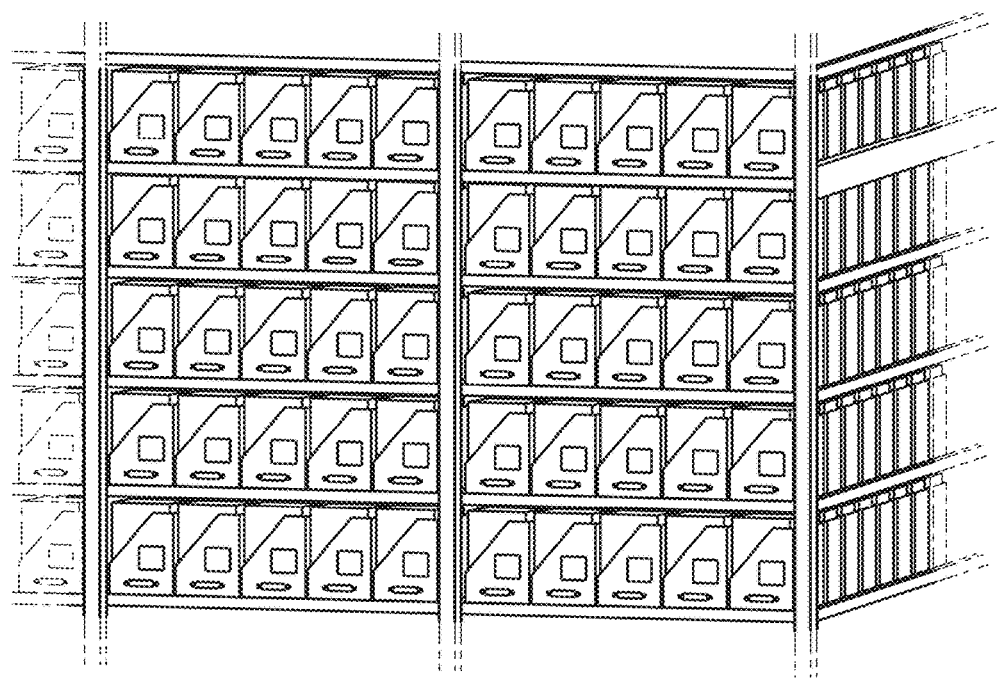
FIG. 1 illustrates a prior storage system.
Figure 2C:
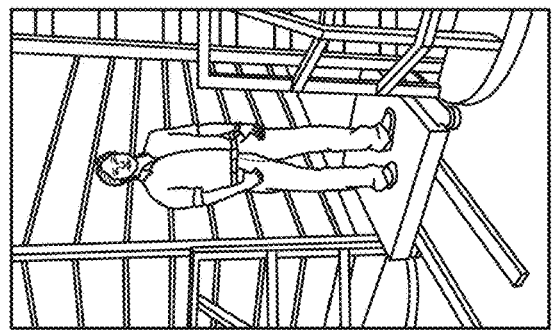
FIGS. 2A-2C illustrate further details of the prior storage system of FIG. 1.
Figure 2B:
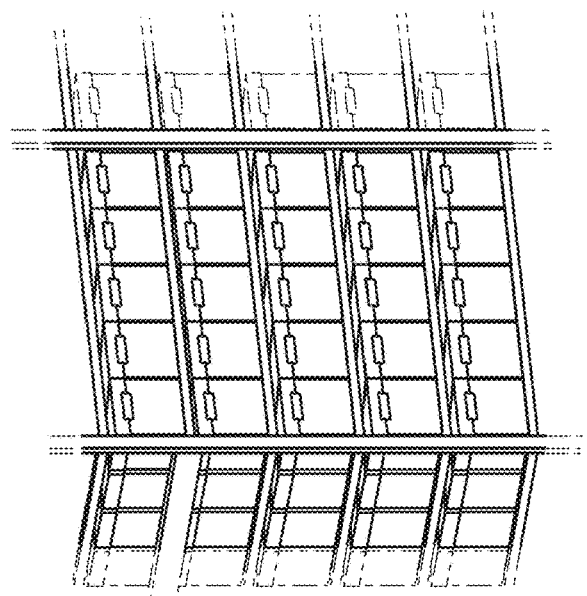
Figure 2A:
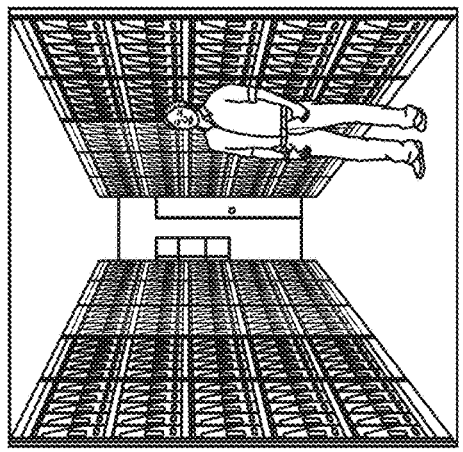
Figure 3:
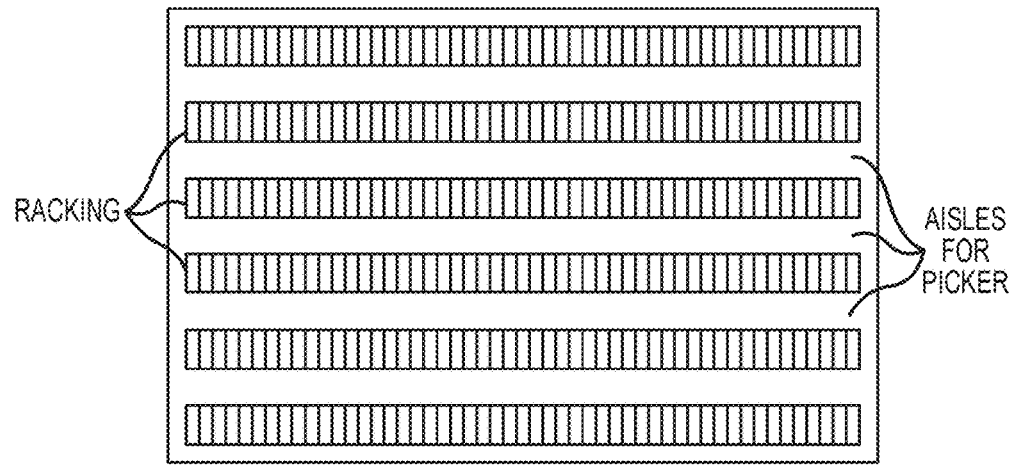
FIG. 3 illustrates further details of the prior storage system of FIG. 1.
Figure 4:
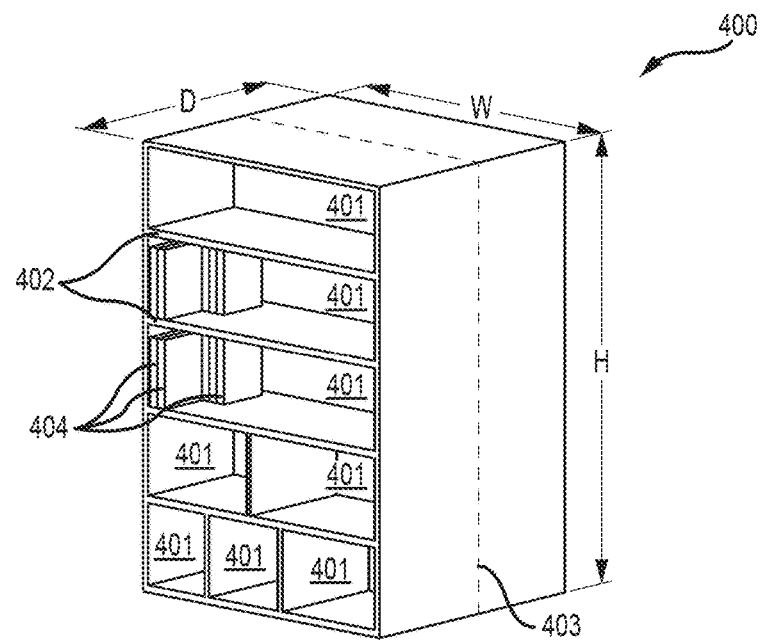
FIG. 4 illustrates a storage module, in accordance with embodiments of the invention.

Embodiments of the present invention may provide customized storage modules having multiple shelves. One embodiment of a storage module 400 is shown in FIG. 4. The shelving on each module may be configured in any way. Moreover, storage modules used in the system may have the same or different shelf configurations depending on the size and shape of the items to be stored. The storage modules 400 used in the storage system may preferably be of uniform exterior dimensions, although this is not a requirement. The storage modules may be of any suitable size, for example having a width W of 0.5 to 2.0 meters, a height H of 0.5 to 3.0 meters, and a depth D of 0.5 to 2.0 meters, although dimensions outside these ranges may also be used. In one embodiment, the storage module 400 has a width W of 1.2 meters, a height H of 1.75 meters, and a depth D of 1.05 meters.

In some embodiments, the storage modules may be sized for optimal filling of an existing space. For example, if a storage system embodying the invention is to be installed in an existing building, custom sized storage modules may be used to ensure that the building space can be substantially filled by an integer number of rack layers, as described below.

The storage module 400 may be divided into compartments 401, for example by shelves 402, which may be uniformly or non-uniformly spaced, and provided in any workable number. Vertical dividers may also be provided (not shown in FIG. 4) for further dividing the module 400 or for further dividing one or more of the compartments 401. The storage module 400 may also be divided 403 in the depth direction. The sides of the module 400 may be left open, or doors or other coverings (not shown) may be provided for additional protection of items stored in the module 400.

The internal compartments 401 may be sized for efficient storage of particular item types. For example, a storage module 400 intended for book storage may have vertical dividers every 12 or 18 inches along each shelf. (Other vertical divider intervals may be used as well, for example longer compartments 401 may be provided for storage of unusually large books.) A storage module 400 intended for clothing storage may omit some or all shelves, but may have hanging rods on which to hang the stored clothing. Some storage modules 400 may be configured for efficient packing of standard 1.2 cubic foot storage boxes. Many other configurations are possible.

Storage modules of multiple internal configurations may be present in the system. That is, some of the storage modules 400 in the system may have a first internal configuration, and others may have a second internal configuration. Any number of different internal configurations may be present. In some embodiments, the shelves, vertical dividers, or both in some or all of the modules 400 may be movable, so that modules can be reconfigured, as is discussed in more detail below.

In the example of FIG. 4, several books 404 are stored within the module 400. The books 404 are preferably selected by size for storage in compartments 401 of sizes similar to the sizes of the books stored in them, to avoid unused space within the module 400, for example as would be necessary if one book on a particular shelf 402 were significantly taller than the other books on the shelf 402. While only a few books 404 are shown in FIG. 4, in some embodiments more books or other items may be stored, so as to fill compartments 401 for maximum storage density.

Preferably, books stored in storage modules 400 are not stored in boxes such as paperboard boxes. Besides the cost of the boxes themselves, the time required to place books or other items in boxes may add to the overall storage cost of the items. In addition, the introduction of boxes tends to reduce the storage density. In some embodiments, trays may be provided that fit the floorplan of each of the compartments 401 of modules 400. The trays can be easily removed and replaced if necessary for stocking and removal of items In other embodiments, the storage modules 400 may not be all rectangular. For example, cylindrical storage modules may be convenient for some stored items. In other embodiments, at least some of the storage modules may simply be storage containers without any internal dividers. For example, a storage container used in embodiments of the invention may be made of a metal base pallet, and a metal frame covered by wire mesh as the enclosure of the module. Other kinds of modules and module construction may also be used.

Figure 5:
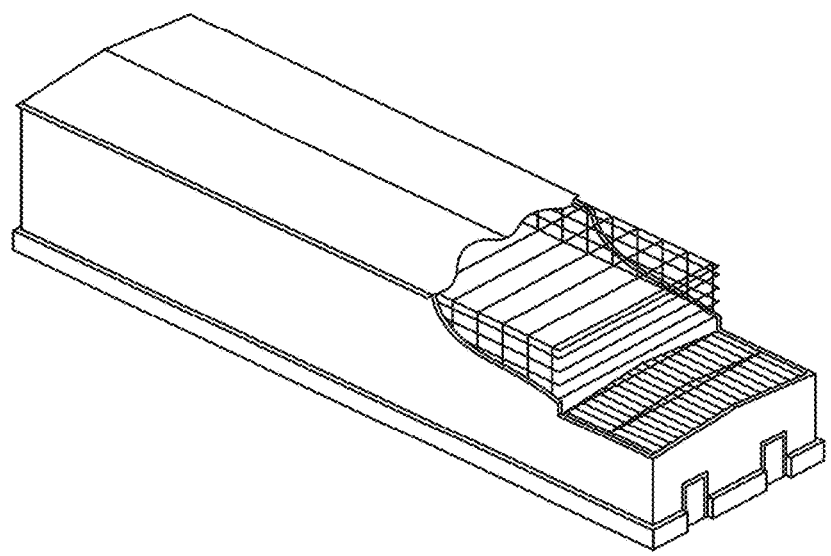
FIG. 5 illustrates an enclosed storage system, in accordance with embodiments of the invention.

The storage modules are stored on racks within a climate-controlled storage space. In some embodiments, panels are provided on and around the racks to enclose the racks and create the enclosed storage space. See FIG. 5.

Figure 6:
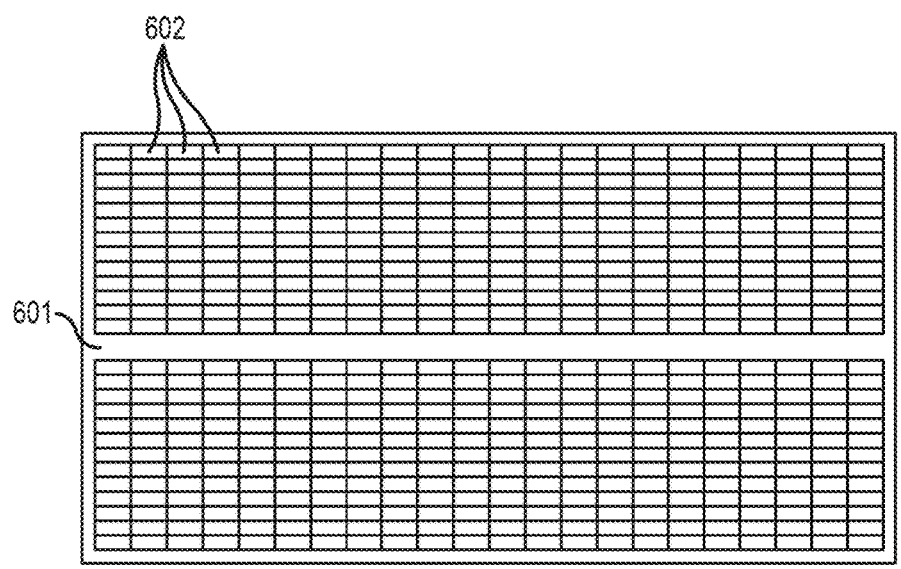
FIG. 6 illustrates a plan view of a pallet shuttle system, in accordance with embodiments of the invention.

The racks within the storage space may be configured in any way. In some embodiments—and unlike the existing rack, aisle, rack configuration currently used—the racks may be positioned directly adjacent each other to increase the storage density. FIG. 6 shows an embodiment of one such configuration. In the arrangement of FIG. 6, a single aisle 601 is provided through which an automated system can access the ends of the racks 602, but no access is provided between the racks 602. Thus, the storage system consume less floor space than in the equivalent Harvard style system, because less floor space is consumed by aisles.

The arrangement of FIG. 6 may be especially suited to use with a pallet shuttle system. Such a system does not require human access to each rack 602, and therefore permits the racks 602 to be positioned closely together or even abutting each other, without any aisles between adjacent racks.

Figure 7:
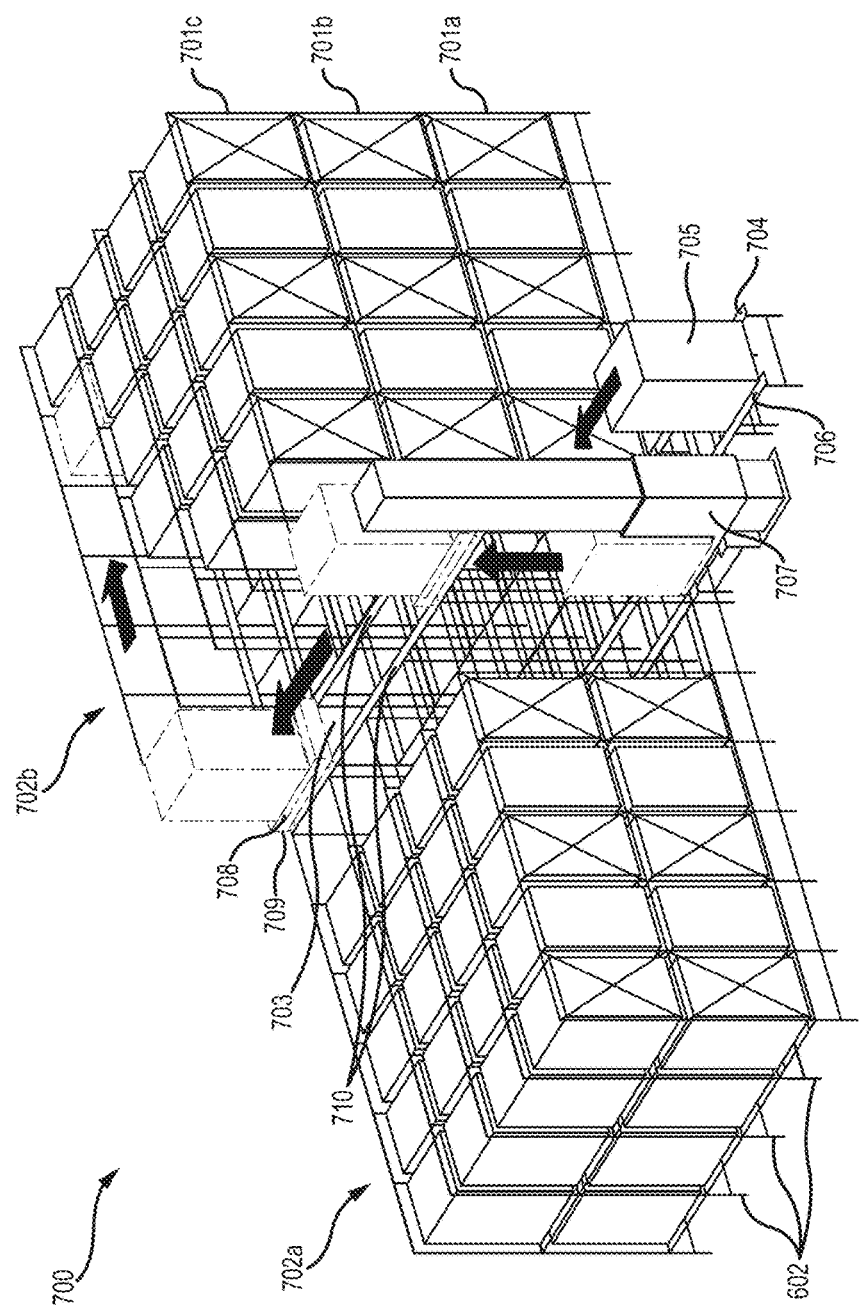
FIG. 7 illustrates the operation of a pallet shuttle system, in accordance with embodiments of the invention.

FIG. 7 illustrates the operation of a pallet shuttle system 700 in accordance with some embodiments. It should be noted that the paneling enclosing the storage space is not present in FIG. 7 for clarity of demonstration. However, paneling would typically be present in an actual system. The rack configuration shown in the figures includes racks 602 (only some of which are labeled) having three levels 701a, 701b, 701c and grouped into two sections 702a, 702b with an aisle 703 separating the two sections. See FIGS. 6 and 7. Again, however different numbers of rack levels and different rack arrangements may be used. Provision of a totally automated and mechanized storage and retrieval system (described below) enables this close arrangement of the racks 602 and the minimal aisle space so as to maximize storage density within the space.

In use, books or other items are loaded into a storage module 400 (typically according to size) outside of the storage space, for example in a loading area 704. Among other things, computer software is used to:

control and maintain a record of how the items are arranged within the storage module;

control and maintain a record of in which storage module a particular item resides as well as the exact location of an item within that storage module;

assign a storage location within the racks to a storage module; and control the movement of the various components of the system to transport and retrieve a storage module to and from its assigned storage location within the storage space.

After books or other items are loaded into a particular storage module 705, the module 705 begins its journey to the storage location assigned by the computer. The storage module 705 is loaded onto a conveyor 706 where it is taken into the storage space through one or more doors (not shown) that are provided to ensure that the desired environmental conditions within the storage area do not fluctuate during ingress and egress of the storage module. For example, the doors may form an air lock.

Upon entry into the storage space, the storage module 705 is conveyed to an elevator 707. More than one elevator 707 may be provided in various locations within the system 700. The elevator 707 elevates the storage module 705 to its assigned level within the racks.

Figure 8:
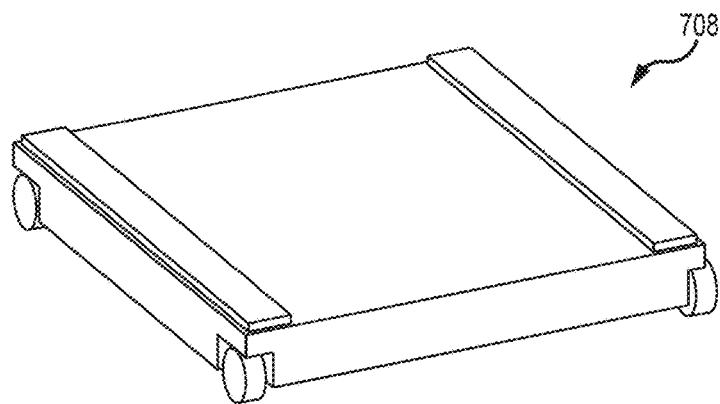
FIG. 8 illustrates a shuttle, in accordance with embodiments of the invention.
Figure 9:
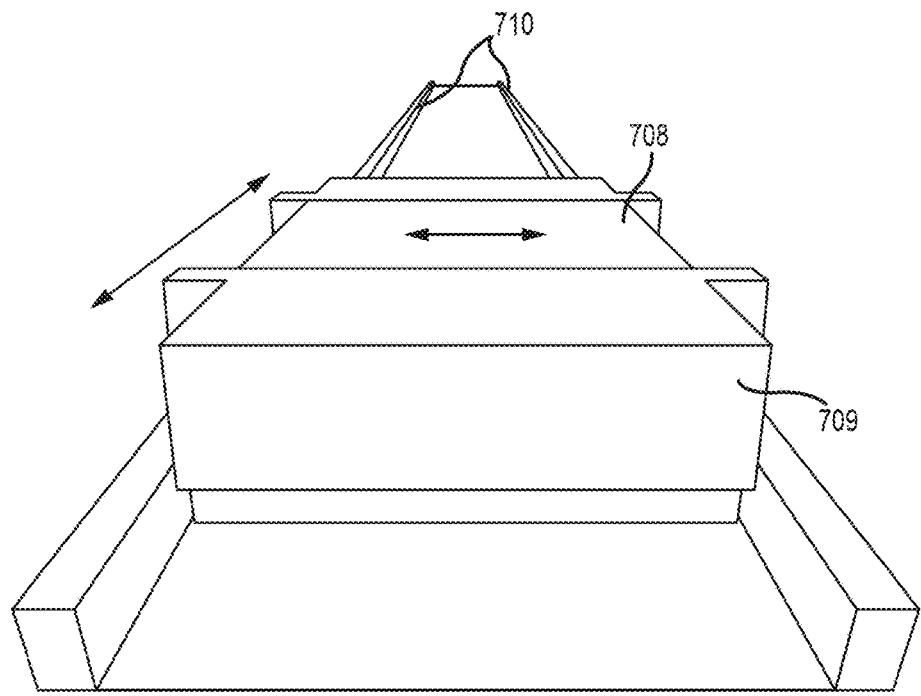
FIG. 9 illustrates a transfer car, in accordance with embodiments of the invention.

Once there, a shuttle 708, which resides in a transfer car 709, moves from its position on the transfer car 709, retrieves the storage module 705, and returns to its position on the transfer car 709 with the storage module 705. A transfer car 709 with associated shuttle 708 will typically be provided on each level of the racks but the system can operate on fewer shuttles 708 if there is less movement of materials. Both move along rails 710 provided on the racking system and each will typically be electrically powered and/or battery powered. An example of shuttle 708 is shown in FIG. 8 in more detail. An example of a transfer car 709 is shown in FIG. 9 in more detail. The transfer cars 709 with associated shuttles 708 are available from a number of different manufacturers, including Auto MHA, Ferretto, and SSI-SCHAFER.

The transfer car 709 (with shuttle 708 and storage module 705) then moves along the rails 710 provided along the length of the aisle 703 until arriving at the rack row assigned to the storage module 705. Once there, the shuttle 708 once again leaves the transfer car 709, travels along the rack row with the storage module 705, deposits the storage module 705 in the proper location, and returns to the transfer car 709. The transfer car 709 then may return to its position proximate the elevator 707 to be ready to receive the next storage module. Alternatively, the transfer car 709 may wait at a location within the racks in anticipation that a storage module retrieval request may occur.

When an item is required to be retrieved from the storage space, the system 700 identifies the storage module 400 where the item is located and retrieves the storage module 400 using essentially the reverse of the process described above. It may be the case that the storage module for retrieval is embedded within a rack row so as to be blocked by other storage modules. In such situations, the shuttle 708 and transfer car 709 may remove the blocking storage modules 400 one at a time and deposit them in another rack row, retrieve the desired storage module 400 and transfer it to the elevator for exit from the storage space, and then reposition the moved storage modules 400 back to an open position within the rack. It may be useful to leave a rack row vacant on every rack level solely for the purpose of providing a temporary holding location for storage modules.

While a system embodying the invention may be used in any suitable application, a pallet shuttle system may be especially well-suited to archival storage having a relatively low circulation rate. This is because the retrieval of items may be slower than in a Harvard style system, due to the possibility of having to shuffle other storage modules 400 out of the way of a module being retrieved. Systems embodying the invention may have, for example, circulation rates of less than 0.5% per year, less than 1% per year, less than 2% per year, less than 3% per year, less than 5% per year, less than 7% per year, or another circulation rate.

The automated nature of embodiments of the present invention significantly reduces the number (and thus the associated labor costs) of workers needed to participate in the process. Moreover, the system can run 24 hours a day, 7 days a week. Given the absence of workers within the space, there is no need to leave the lights on in the space. This saves on energy costs, increases productivity, and also helps to preserve the items being stored. Studies have shown that preservation is improved when the content being stored is in an environment tailored to the ideal environmental conditions of particular items, and may also be enhanced by maintaining a hypoxic environment within the storage space and/or creating micro-climates, as discussed below.

Traditionally, offsite storage facilities have been required to include fire suppression systems, which typically take the form of sprinkler systems that activate in the event of a fire. In the event of a fire, many of the stored assets are destroyed not only by the fire itself but also by water damage they suffer from the sprinklers. Even when not activated, the sprinkler heads are prone to leak and damage the books. Some embodiments of the present system avoid these risks (both fire and water damage) by utilizing a fire prevention—as opposed to fire suppression—system that maintains a hypoxic environment within the storage space. More specifically, an environment is maintained whereby the oxygen level is too low to sustain combustion such that fires cannot occur at all. By way only of example, standard air contains about 21% oxygen. In embodiments of the invention, the oxygen content of air within the storage system may be reduced. The oxygen level may be reduced to any desired percentage, for example, 16.5%, 13.5%, 9%, or another desired level. Preferably the oxygen level is reduced such that the environment will not sustain combustion. In some embodiments, rodents, fungus, bacteria, etc.—all things that can further damage books and other stored items—also cannot grow or survive in the reduced oxygen environment. Sprinkler systems also consume space within the storage system and their geometric configuration is very defined and may therefore have a significantly adverse effect on storage density. By removing the need for in-rack and roof level sprinkler systems, space is freed up for storage, and thus storage density is increased.

In one embodiment, the oxygen is reduced in the environment by increasing the nitrogen content in the space. One such system separates the air into oxygen and nitrogen, extracts the oxygen, and pumps the nitrogen into the storage space. The air quality—including the temperature, humidity, and oxygen level—is monitored and adjusted as necessary. Available systems and equipment for monitoring and controlling the storage space environment are available from Wagner Group GmbH of Langenhage, Germany, and Fire-Pass Corporation of New York, N.Y., USA. The reduced oxygen level poses no risk to workers given the automated nature of the storage system that obviates (or at least significantly reduces) the need to have workers present within the space at all. In addition, humans may be able to work within the reduced oxygen environment.

The storage space should also be climate-controlled as has typically been done. The temperature and humidity levels may be varied depending on the items being stored in the space. In some situations, the ideal environmental conditions for the items being stored in the space may differ. For example, it may be desired to store the books within the storage space at one temperature and the film within the storage space at a different temperature. In such situations, it may be advantageous to use paneling or other means on the racking to divide the space into smaller compartments and independently control the environmental conditions in each such smaller compartment so as effectively to create different micro-climates within the same storage space. In one possible embodiment, the HVAC unit associated with the storage space is set to maintain a constant temperature (e.g., 45° F.) and vents/diffusers/etc. are associated with the smaller compartments to control the ingress/egress of air into the compartments. For example, if it is desirable to store items in a compartment at a temperature more than the set temperature of 45° F., then less of the cooler air would be permitted to enter that particular compartment. Curtains or other barrier methods (see, e.g., FIG. 10) may be provided at the borders between the compartments to help retain the desired environmental conditions within each compartment while still allowing the shuttles 708 and transfer cars 709 to move between compartments.

Figure 11:
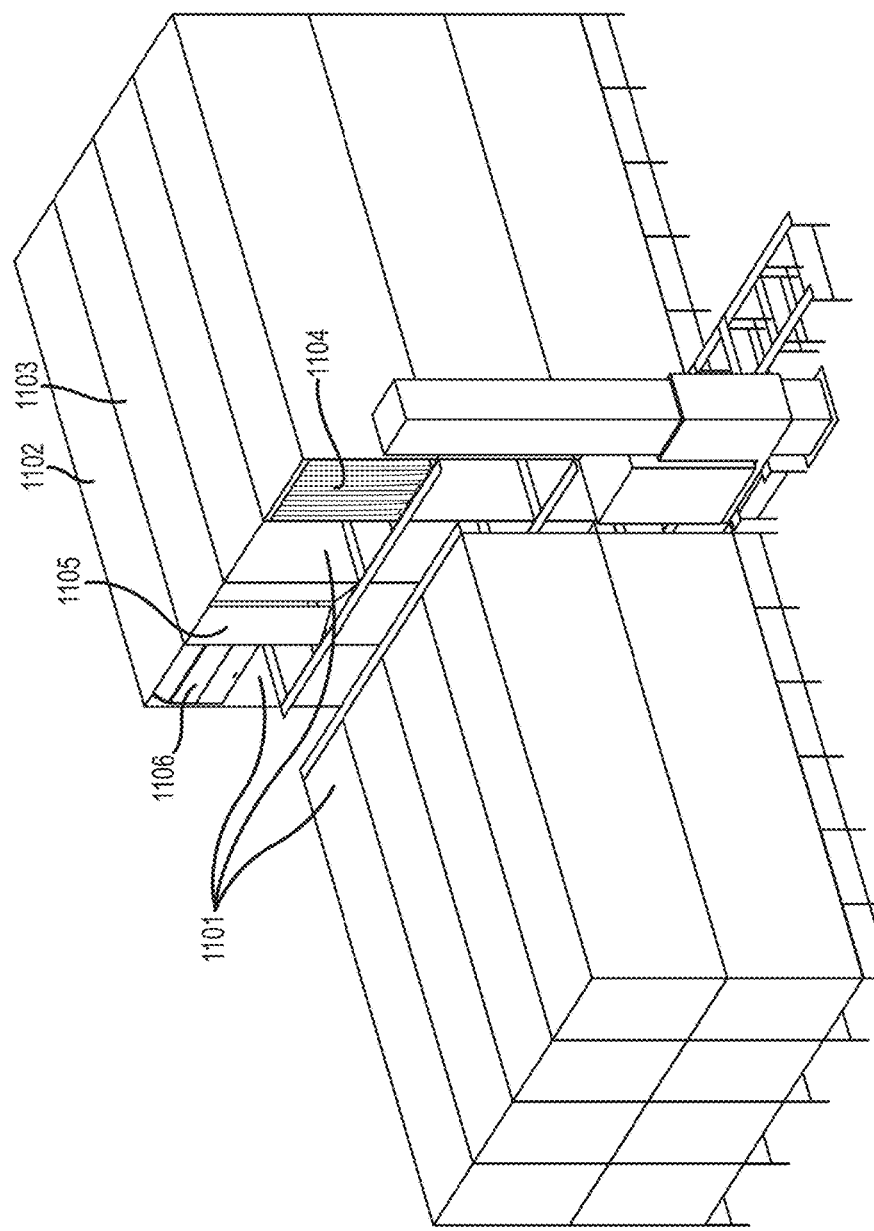
FIG. 11 illustrates a pallet shuttle system divided into zones, in accordance with embodiments of the invention.

FIG. 11 illustrates one example technique for forming micro-climates within the racks. In the example of FIG. 11, paneling 1101 is positioned to separate the enclosure holding the racks into separately climate controlled zones such as zones 1102 and 1103. The sizes of the zones may be selected based on the need for storage in different environments. In the example of FIG. 11, each zone 1102 encompasses only one rack, but in other embodiments, one or more zones may encompass multiple racks. Any workable combination of sizes is possible. Zones may encompass multiple racks on a single rack level, may encompass racks on multiple rack levels, or both. The paneling 1101 may provide thermal insulation, and may be sealed to a degree that it is possible to maintain a hypoxic environment within a zone.

The paneling 1101 may be made of any suitable material, but in some embodiments may be made of metal clad foam insulation. One example paneling material is Isobox paneling made by Isopan S.p.A of Verona, Italy. The paneling 1101 may be attached to the racking structure and placed as infills between the rack structure, and then the interior of the racking columns (which may be hollow) may be filled with spray polyurethane insulation for continuity of separation.

Preferably, each zone includes one or more zone doors that sufficiently isolate the zone for climate control, but allow access by the shuttle 708. Several different example kinds of doors are illustrated in FIG. 11, but it should be recognized that other kinds of doors may be used as well. Not all of the doors need be of the same type.

Figure 10:
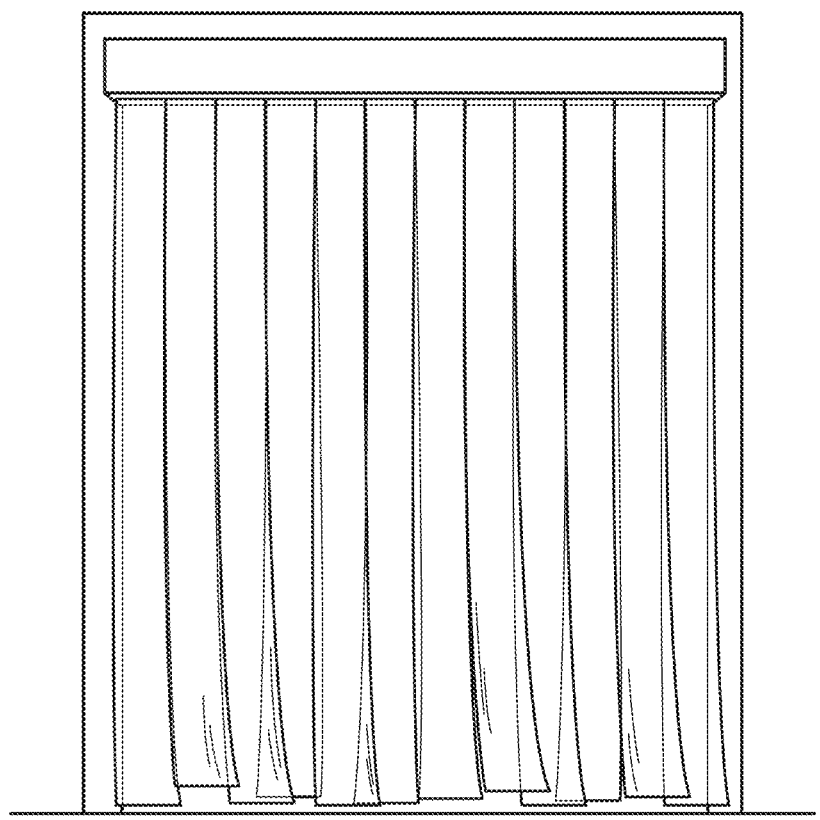
FIG. 10 illustrates a curtain door, in accordance with embodiments of the invention.

Example door 1104 is a simple curtain of the type shown in FIG. 10. Example door 1105 uses swinging panels to admit storage modules and then automatically close to maintain separation of the zone. The panels of the door 1105 may conveniently be made of the same material as the paneling 1101, but this is not a requirement. Doors such as the example doors 1104 and 1105 may be actuated by the motion of items into and out of the zone, for example the shuttle 708, with or without a storage module. In this arrangement, a closure device is preferably provided for smooth closure of the door 1105. In other embodiments, a door such as the example door 1105 may be independently actuated under the control of the computer system, to open and close as needed to permit access to the zone by the shuttle 708, and to close the zone when it is not being accessed.

Example door 1106 is a "garage door" style door that raises to admit a storage module, and then lowers to close off the zone. The door 1106 may have the advantage of consuming less space than a door like the example door 1105, but may require computer control rather than being actuated by the motion of the shuttle 708.

In this way, different kinds of items having different storage environment requirements may be stored within the same building or other enclosure. For example, books may be stored at one temperature/humidity condition, wine may be stored at a different temperature than books, and so forth. In some embodiments, one or more zones may be held refrigerated temperatures (34-40° F., e.g.) for the storage of food or medicines. In some embodiments, one or more zones may be held below 32° F., and may be used for storage of frozen foods or other items best stored in freezing temperatures.

The division of the enclosure into separately climate-controlled zones improves the flexibility of the system, further increasing the storage density. Only as much of the enclosure as necessary need be held at each environmental condition. Heating, ventilating, and air conditioning (HVAC) systems can be sized specifically for the expected distribution requirements, and may be smaller (and therefore less expensive) than HVAC system capable of conditioning the entire enclosure volume to the most energy-intensive environment foreseen.

In some embodiments, the HVAC systems are configurable to enable reconfiguring the climate-controlled zones. For example, if a large group of items requiring storage in a particular temperature/humidity condition is received, zones previously used for storage of other kinds of items may be reconfigured to the particular temperature/humidity condition, to increase the capacity of the system to store items in that condition.

Figure 12:
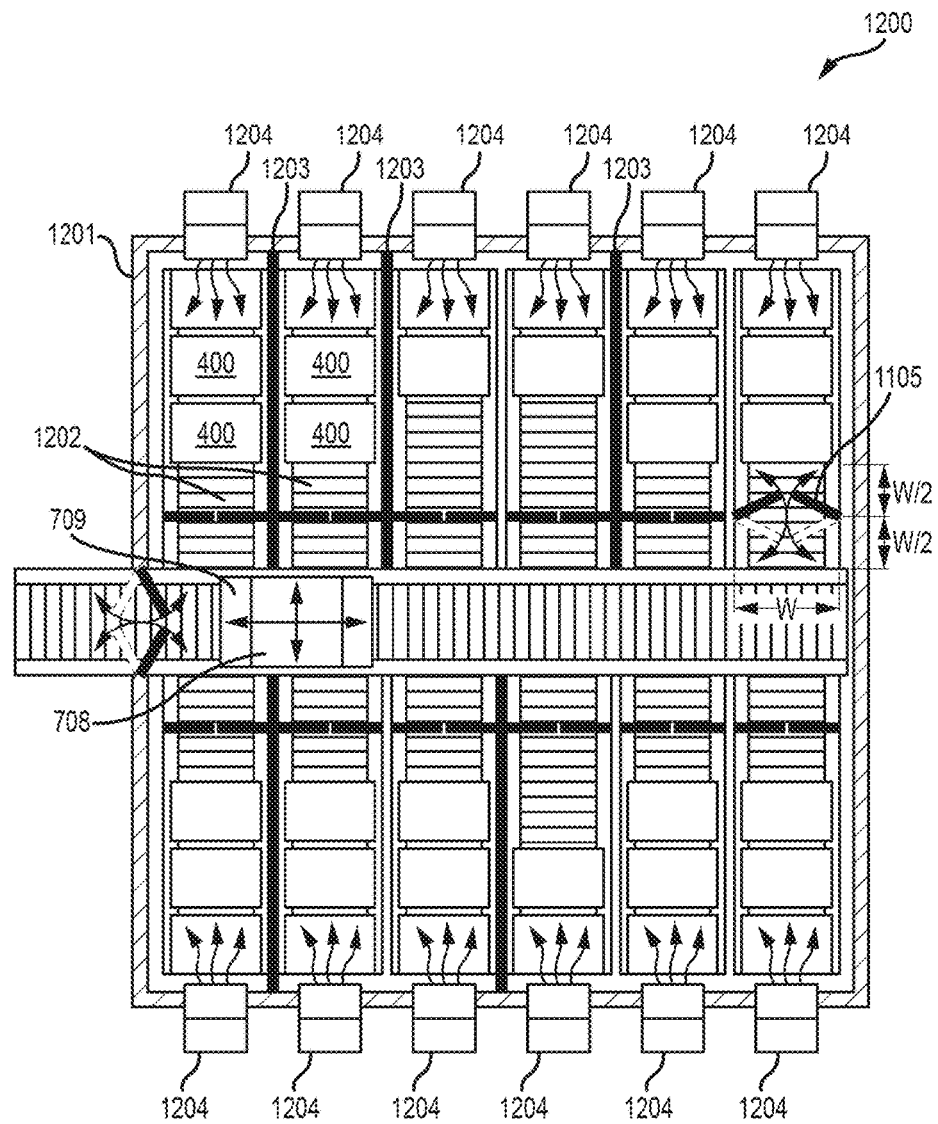
FIG. 12 illustrates additional details of a pallet shuttle system divided into zones, in accordance with embodiments of the invention.

FIG. 12 illustrates one example arrangement of an enclosure 1200 having separately climate-controlled zones, and an example way of controlling the zones. In the example of FIG. 12, an enclosure 1201 encloses a number of racks 1202. A number of partitions 1203 divide the enclosure 1201 into a number of zones. Storage modules 400 are moved into and out of the racks 1202 by transfer car 709 and shuttle 708, through any necessary doors at the entrance to the enclosure 1201 and at the entrances of the individual zones. Preferably, the partitions 1203 provide a measure of thermal insulation. A number of unitary HVAC systems 1204 are positioned to individually heat and/or cool the separate zones. HVAC systems 1204 may be, for example, computer room air conditioning (CRAC) units of the kind often used for environmental control of computer rooms or data centers. CRAC units may have the advantage that they can also control humidity, in addition to temperature. Individual thermostats may be provided within the zones, for controlling HVAC systems 1204. Preferably, the thermostats are connected to and controlled by a central control system, for monitoring of the environments in the zones and reconfiguration of the zones when storage requirements change.

In other embodiments, different techniques for heating and cooling the individual zones may be used. For example, a dual-duct HVAC system may be installed near the enclosure 1201, and each zone may be provided with a damper box for admitting heated or cooled air as necessary to maintain the desired temperature in each zone.

Although any arrangement is possible, it may be preferable to place zones having similar temperatures together, to avoid the need to maintain large temperature differentials between adjacent zones. For example, the warmest zone in a row of zones may be placed at one end of the row, and the coldest zone may be placed at the other end, so that the natural heat flow through the partitions 1203 tends to complement the action of HVAC units 1204, rather than oppose it.

Humidity may be controlled by the introduction of humidified air into the individual zones or the removal of moisture from the air in the individual zones, for example under the control of a humidistat placed in each humidity-controlled zone. Preferably, any water removed from the air is drained from the enclosure, and no reservoir of water for humidification is present in any zone.

In some embodiments, the environment within the interior of the enclosure 1201 is hypoxic. In other embodiments, only some individual zones may enclose hypoxic environments, although it may be preferable for the entire interior of the enclosure 1201 to be hypoxic, to avoid the need for fire suppression equipment anywhere within the enclosure 1201.

FIG. 12 also shows the operation of zone doors like the example door 1105 discussed above. The two-way swinging door 1105 requires that a dead space equal to the width of a module 400 be left at the entrance to each zone, to accommodate the swinging of the door 1105.

Embodiments of the invention enable storage system such as pallet shuttle system 700 to be used efficiently for the benefit of multiple entities. For example, in traditional storage systems, a business or individual wishing to store items would rent a fixed storage space in a building divided into many such storage spaces. Because each tenant may not fill its storage space to capacity, much of the building volume may be empty. The inefficient use of the building volume requires that the cost of storing any particular item within the facility be burdened with part of the fixed cost of the empty space in the building. While individual tenants may rent spaces of different sizes, or may rent different numbers of spaces, it is difficult to optimize the number and sizes of the storage spaces for efficient space usage. Furthermore, because each storage space must be individually accessible, even more of the building volume may be unproductively consumed by aisles.

In embodiments of the invention, each tenant may rent individual storage modules 400 or even individual compartments 401 within storage modules 400, so that tenants can rent space in small incremental amounts only as needed, and therefore need not rent empty space that they may not need. The control system of system 700 may maintain a record of which storage module and which compartment 401 a particular item is stored in, so that items from a large number of different tenants can be stored within system 700, and retrieved on demand. Because each individual tenant can store its items very densely (with little wasted space), the space within the entire facility can be utilized efficiently as well. Each tenant may be charged based on its usage of the system, for example the number of storage modules 400 or compartments 401 the tenant uses. Charges may be based on other aspects of each tenant's usage of the system as well. For example, a charge could be made for each item deposit or retrieval, in addition to a charge for each module or compartment consumed by the tenant.

The system may track and report utilization. Using book storage as an example, because the system knows the sizes of the modules 400 and compartments 401 and the number of books stored in each module 400 and compartment 401, the system can estimate whether each module 400 or compartment 401 is filled to capacity. This information may be used for a variety of purposes, for example to identify potential storage locations for newly-received books from the same tenant, or to identify tenants whose space is not utilized densely.

Some of the modules 400 may be specially designated for fast retrieval, in which case the system will avoid moving those modules 400 to the most distant ends of racks 602. That is, modules designate for fast retrieval may be kept near aisle 703, so that minimal shuffling of other modules 400 will be necessary in order to retrieve a specially-designated module 400.

Once a storage module 400 or compartment 401 is designated for the use of a particular tenant, the system can disallow storage of other tenants' items in that module 400 or compartment 401, at least until the module 400 or compartment 401 is emptied.

Figure 13A:
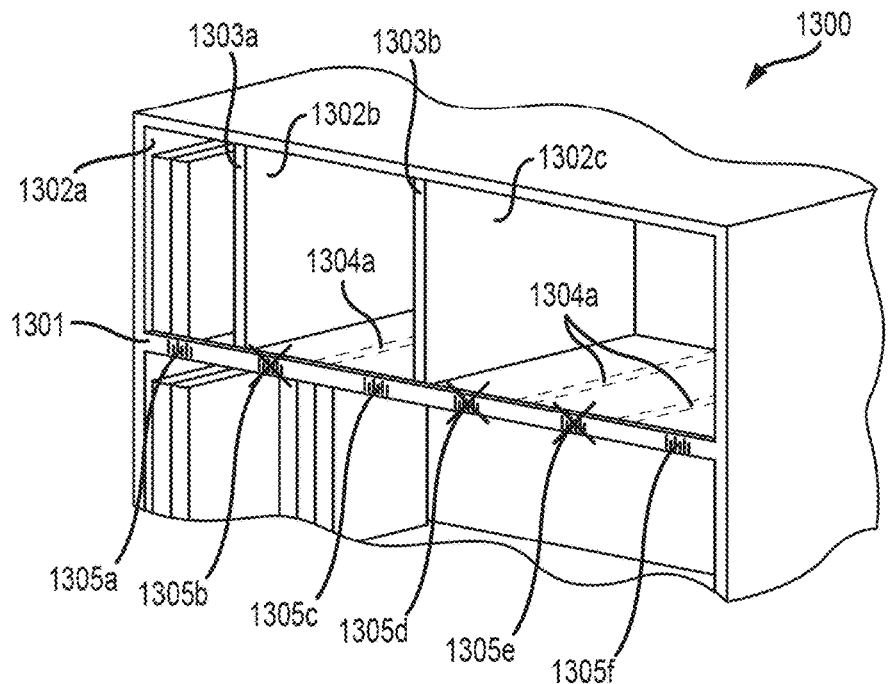
FIGS. 13A and 13B illustrate a configurable storage module, in accordance with embodiments of the invention.
Figure 13B:
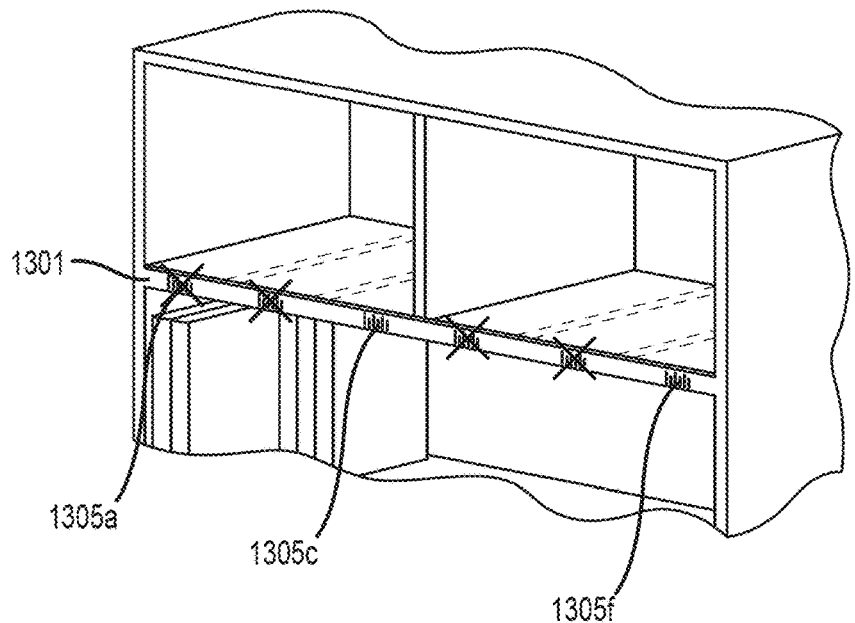

FIGS. 13A and 13B illustrate an example technique for tracking of items stored in reconfigurable storage modules 400. FIG. 13A is a partial view of a particular storage module 1300, having its top shelf 1301 divided into three storage compartments 1302*a*, 1302*b*, and 1302*c*, by virtue of vertical dividers 1303*a* and 1303*b*. Additional possible divider locations 1304*a*, 1304*b*, and 1304*c* are provided, for dividing the top shelf 1301 into different-sized compartments. Thus, the number and size of the compartments may be tailored to the size of the items to be stored in the module 1300.

To enable tracking of items to the storage compartment they are stored in, it may be necessary to inform the system controller of the configuration of each storage module 1300. In the example of FIG. 13A, barcodes 1305*a*-1305*f* or other indicia are provided at each possible compartment location on each shelf of the module 1300. For example, the barcodes 1305*a*-1305*f* may be provided every six inches along the shelf 1301. Each of the barcodes 1305*a*-1305*f* uniquely identifies one of the possible compartment locations. To indicate that a divider is missing and that a particular compartment encompasses two bar or more codes, certain of the barcodes 1305*a*-1305*f* can be "deactivated". That is, the controller may be informed that certain barcodes do not designate separate storage compartments. In the example of FIG. 13A, the barcodes 1305*b*, 1305*d*, and 1305*e* are deactivated, so the right-most barcode for each compartment designates the end of its respective compartment. The controller can determine that the barcode 1305*a* designates a single-width compartment. Because the barcode 1305*b* is inactive and the next active barcode is the barcode 1305*c*, the controller can determine that the next compartment on the row is double-wide, and is associated with the barcode 1305*b*. Similarly, the next compartment is triple-wide and is associated with the barcode 1305*f*.

In some embodiments, the controller may group or map together barcodes or other indicia corresponding to a single compartment, so that scanning any of them is equivalent to scanning the right-most barcode, and is sufficient to identify the compartment. This arrangement may give the operator more potential scan targets, and may reduce errors.

In other embodiments, the left-most barcode for each compartment may be used.

The barcodes 1305*a*-1305*f* are but one example of indicia that may be used to demarcate and label particular storage compartments. In other embodiments, electronic indicia such as radio frequency identification (RFID) tags or near field communication (NFC) tags may be used. Other kinds of printed indicia may be used as well, for example QR codes (a two-dimensional pattern similar to a barcode).

FIG. 13B illustrates the storage module 1300 after reconfiguration, to remove the divider 1303*a*. The barcode 1305*a* has been "deactivated", so the system controller can recognize that there are now only two compartments on the shelf 1301, and that both are triple-wide, and are associated with barcodes 1305*c* and 1305*f*.

For initial configuration of the storage module, the user may set all of the location dividers and enter a storage module configuration mode in the controller software. By starting at the top left and scanning the right most barcode for each location, the system will set up the available locations in the software. Then when the user starts loading content into the storage modules, the software will drive the user to available locations.

In some embodiments the inventory tracking system uses a hierarchical system to manage customers and their inventory. This allows for an institutional hierarchy or for a single collector to have separate collections.

Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the invention.

What is claimed is:

1. A storage system for storing items, comprising:
   an enclosure enclosing a hypoxic environment;
   a pallet shuttle system comprising rows of racks within the hypoxic environment and at least one transfer car and at least one shuttle, wherein the pallet shuttle system is configured for carrying storage modules into and out of the racks;
   at least one loading station disposed outside the hypoxic environment;
   an enclosure door to the hypoxic environment, the enclosure door operable to admit one of the at least one transfer car of the pallet shuttle system into and out of the hypoxic environment, and operable to close the hypoxic environment upon passage of the admitted transfer car through the door;
   paneling separating the enclosure into at least two separately climate-controlled zones such that at least one of the racks is in each of the at least two separately climate-controlled zones; and
   a zone door to each of the climate-controlled zones, each zone door operable to admit one of the at least one shuttle of the pallet shuttle system into and out of the climate-controlled zone, and operable to close the climate-controlled zone upon passage of the admitted shuttle through the zone door.

2. The storage system of claim 1, wherein the enclosure door provides an air lock.

3. A storage system for storing items, comprising:
   an enclosure;
   a loading area;
   a pallet shuttle system comprising rows of racks within the enclosure and at least one shuttle and at least one transfer car, wherein the pallet shuttle system is configured for carrying storage modules into and out of the racks;
   paneling separating the enclosure into at least two separately climate-controlled zones such that at least one of the racks is in each of the two separately climate-controlled zones; and
   a zone door to each of the climate-controlled zones, each zone door operable to admit one of the at least one shuttle of the pallet shuttle system into and out of the climate-controlled zone, and operable to close the climate-controlled zone upon passage of the admitted shuttle through the zone door.

4. The storage system of claim 3, wherein at least one of the climate-controlled zones includes a hypoxic environment.

5. The storage system of claim 3, further comprising a plurality of storage modules.

6. The storage system of claim 5, further comprising a computerized control system including a processor and memory, wherein the processor stores instructions that, when executed by the processor, cause the computerized controller to:
   maintain a record of which items are stored in which storage modules;
   maintain a record of the location of each of the storage modules within the racks; and
   control the pallet shuttle system to deposit and retrieve the storage modules into and from the racks to store and retrieve the items.

7. The storage system of claim 6, wherein instructions that, when executed by the processor, cause the computerized controller to, when a particular item is received for storage in the storage system:
   identify which particular storage module the particular item is to be stored in;
   control the pallet shuttle system to present the particular storage module to the loading area for placing the particular item into the particular storage module;
   control the pallet shuttle system to place the particular storage module onto one of the racks; and
   modify the records to reflect the location of the particular storage module within the racks and that the particular item is stored in the particular storage module.

8. The storage system of claim 6, wherein instructions that, when executed by the processor, cause the computerized controller to, when a particular item is requested for retrieval from the storage system:
   identify from the record which particular storage module the particular item is stored in and the location of the particular storage module in the racks;
   control the pallet shuttle system to present the particular storage module to the loading area for retrieval of the particular item; and
   modify the record of which items are stored in which storage modules to reflect that the particular item is no longer stored in the storage system.

9. The storage system of claim 6, wherein:
   the storage modules are of uniform external dimensions and include storage modules of at least two different internal configurations, each of the storage modules having one or more internal compartments; and
   the instructions, when executed by the processor, cause the computerized controller to maintain a record of which items are stored in which compartments of which storage modules.

10. The storage system of claim 9, wherein at least some of the storage modules are internally reconfigurable.

11. The storage system of claim 10, wherein a shelf of an internally reconfigurable includes a number printed or electronic indicia identifying regions of the shelf, and wherein the arrangement of vertical divisions of the shelf is communicated to the storage system by deactivating one or more of the printed or electronic indicia.

\* \* \* \* \*